J. E. NEWCOMB.
CAR BRAKE OPERATING MECHANISM.
No. 174,698. Patented March 14, 1876.
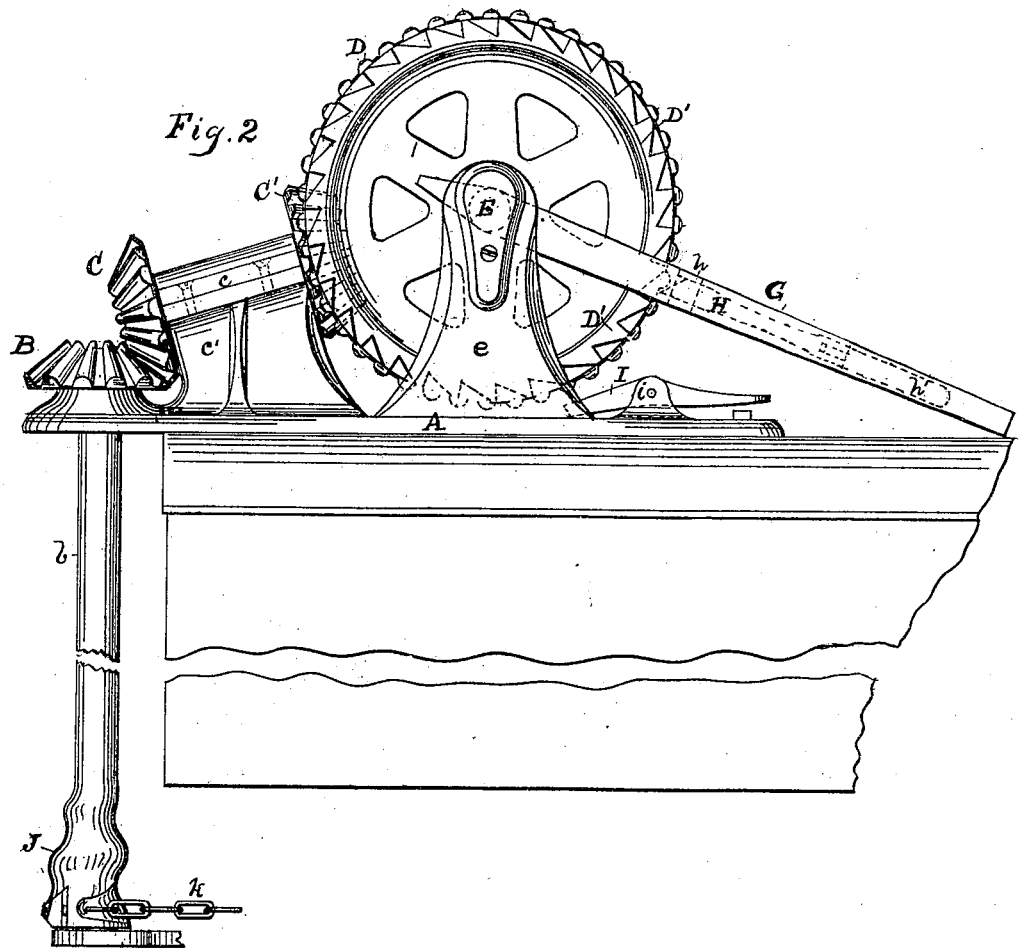
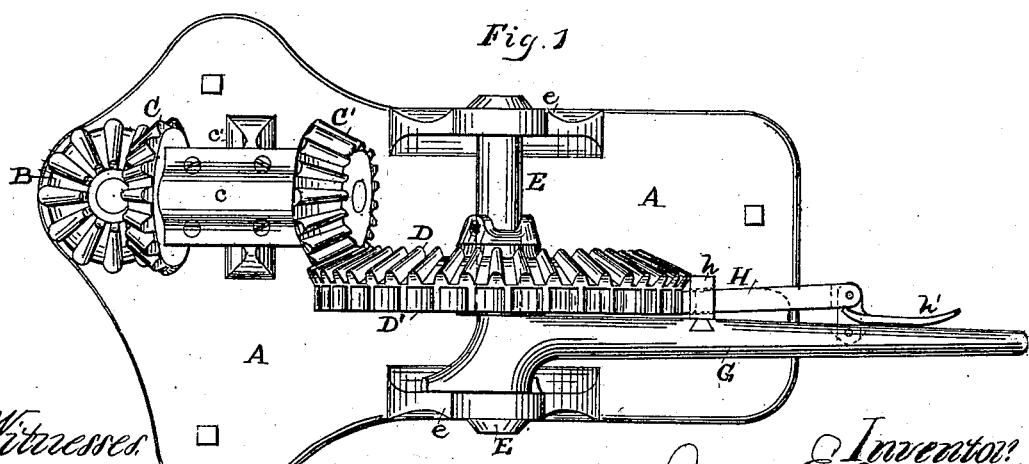

UNITED STATES PATENT OFFICE.

JAMES E. NEWCOMB, OF MUSCATINE, IOWA, ASSIGNOR OF ONE-HALF HIS RIGHT TO JAMES M. WIER, OF SAME PLACE.

IMPROVEMENT IN CAR-BRAKE-OPERATING MECHANISM.

Specification forming part of Letters Patent No. 174,698, dated March 14, 1876; application filed February 1, 1876.

*To all whom it may concern:*

Be it known that I, JAMES E. NEWCOMB, of Muscatine, county of Muscatine and State of Iowa, have invented certain new and useful Improvements in Car-Brake-Operating Mechanism; and I hereby declare the following to be a full, clear, and exact description of the construction and operation of the same, and such as will enable any one skilled in the art to which it pertains to make and use the same, reference being had to the accompanying drawings, forming a part of this specification, and in which—

Figure 1 is a top view of my invention, or that portion thereof which is seated on the top of the car or platform, and Fig. 2 is a side elevation.

The nature of my invention relates to a device for operating the brake-wheel of railway-cars, and to improvements in the stem of the brake-wheel; and the invention consists, first, in the combination of a series of gear-wheels with a cogged brake wheel, for the purpose of operating the same; second, in the combination of a hand-lever with aforesaid devices, for actuating them, and serving as an indicator when the brakes are set or free, and also in certain combinations of devices, all as hereinafter fully described.

Referring to the parts by letters, A is a plate to which the parts are attached for convenient attachment to a car. B is a pinion, mounted on the upper end of a stem, $b$, which occupies the ordinary position of the common brake-wheel stem. C is a spur-pinion on a shaft, $c$, which is mounted in suitable bearings on a standard, $c'$, from the plate A, and carries on its other end a pinion, C', which gears with a bevel spur-wheel, D, carried loosely on a shaft, E, which has suitable bearings in standards $e$, which project upward from the plate A. The rear side of the wheel D is formed into a ratchet-wheel, D'. G is a hand-lever, attached rigidly at its lower end to the shaft E. H is a sliding dog, its lower end passing through a yoke, $h$, on the hand-lever G, and its upper end connected to an elbow-shaped thumb-lever, $h'$, by pressing the handle of which to the lever G the dog H may be raised, and by releasing which the dog H may drop by its own gravity and engage with the ratchet-teeth D'. I is a detent-lever, pivoted to standards $i$, so that its end next the ratchet D' drops by gravity, and may be raised to act as a stop to said wheel by pressure with the foot on its other end. J is a conical spiral groove on the lower end of the stem $b$, and the chain $k$ is attached to its lower enlarged end or base, and extends to the brake-levers, in the ordinary manner.

The drawings show the lever G in the position to indicate "brakes off." To apply the brakes the lever G may be taken hold of and turned upward to a vertical position, the dog H sliding freely over the ratchet teeth until a return movement is attempted, when it engages with a tooth and rotates the wheel D with it, and through the intermediate gear-wheels actuates the stem $b$, and winds the chain $k$ on the fusee J. This operation may be repeated if the first does not apply the brakes sufficiently close. When the brakes are applied the detent I may be engaged with the ratchet-wheel D' to secure them, until, by releasing it and pressing on the thumb-lever $h'$, the dog H may be held up and the wheel D be free to revolve and allow the chain $k$ to unwind.

The lever G in an upright position may indicate any car on which the brakes are set.

I claim—

1. The spur-wheel D, arranged to operate with the pinions C, C', and B, and stem $b$, for applying car-brakes, substantially as and for the purpose specified.

2. The lever G, arranged to operate with the ratchet spur-wheel D D', pinions C, C', and B, and stem $b$, substantially as and for the purpose specified.

3. The detent I, ratchet spur-wheel D D', pinions C, C', and B, and stem $b$, combined to operate on the chain $k$, substantially as and for the purpose specified.

4. The wheel D D', arranged to operate with the pinion B, on an ordinary brake-wheel stem, substantially as and for the purpose specified.

JAMES E. NEWCOMB.

Witnesses:
THOS. MCKEE,
C. M. HALL.